United States Patent [19]

Pannier

[11] Patent Number: 4,924,364
[45] Date of Patent: May 8, 1990

[54] FLUSH-TYPE AIRPORT RUNWAY LIGHT, WITH REMOVABLE OPTICAL UNIT

[75] Inventor: Daniel Pannier, Les Andelys, France

[73] Assignee: Societe Anonyme, Paris, France

[21] Appl. No.: 171,130

[22] Filed: Mar. 21, 1988

[30] Foreign Application Priority Data

Apr. 1, 1987 [FR] France .............................. 87 04571

[51] Int. Cl.$^5$ .............................................. F21S 1/02
[52] U.S. Cl. .................................. 362/153.1; 362/285; 362/364
[58] Field of Search .............. 362/364, 374, 267, 308, 362/309, 145, 153, 285, 153.1; 340/947, 953, 954

[56] References Cited

U.S. PATENT DOCUMENTS

| | | | |
|---|---|---|---|
| 3,113,726 | 12/1963 | Pennow et al. | 362/267 |
| 3,146,954 | 9/1964 | Hochstein | 362/267 |
| 3,250,907 | 5/1966 | Keck et al. | 362/308 |
| 3,369,113 | 2/1968 | Loch | 362/267 |
| 3,535,504 | 10/1970 | Beal et al. | 362/308 |

FOREIGN PATENT DOCUMENTS

| | | | |
|---|---|---|---|
| 25639 | 3/1930 | Australia | 362/145 |
| 1936925 | 1/1970 | Fed. Rep. of Germany | 362/364 |
| 1287833 | 2/1962 | France | 362/267 |
| 1494543 | 7/1967 | France | 362/364 |
| 890026 | 2/1962 | United Kingdom | 362/267 |

*Primary Examiner*—Ira S. Lazarus
*Assistant Examiner*—Richard R. Cole
*Attorney, Agent, or Firm*—Marshall & Melhorn

[57] ABSTRACT

The flush-type airport runway light according to the invention comprises an embedded seating, a lid fixed on the seating, and an optical unit which is removable through an opening in the center of the lid and which is housed, while in its working position, so as to be on the same upper level as the lid and; equipped with means for guiding the optical unit in vertical translation, as well as means for interlocking the optical unit and the lid arranged in such a way that the locking or unlocking control of said means causes an upward or downward vertical translational motion of said unit between a grasping position in which the unit protrudes sufficiently from the upper level of the lid to be grasped and removed from its working position, and vice-versa.

9 Claims, 3 Drawing Sheets

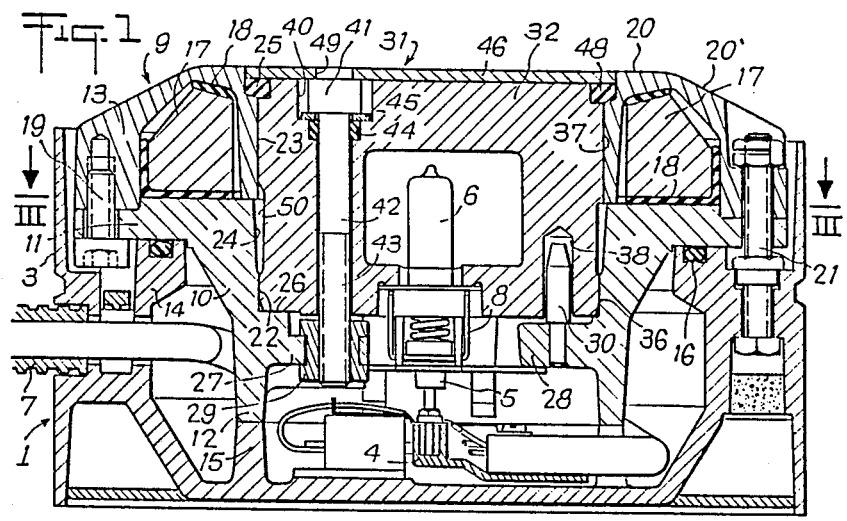
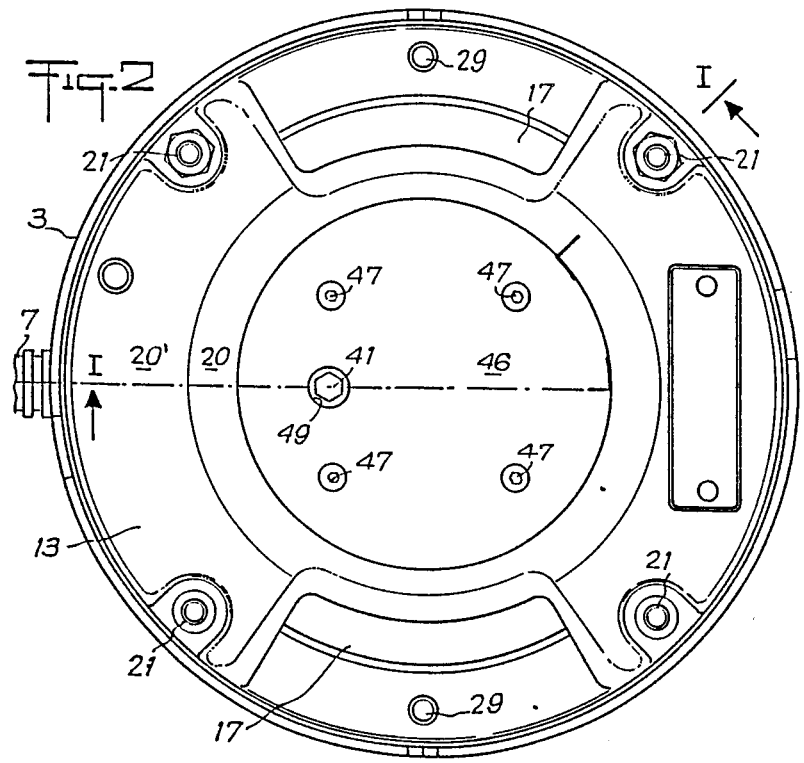

FLUSH-TYPE AIRPORT RUNWAY LIGHT, WITH REMOVABLE OPTICAL UNIT

FIELD OF THE INVENTION

The invention relates to a flush-type runway light for airport runways or the like.

BACKGROUND OF THE INVENTION

The known runway lights are constituted of an embedded seating, of a lid fixed on the base with generally an integrated uni- or bi-directional prism, and of an optical unit containing in particular the lamp.

Replacement of the lamp or of the colored filter in such lights (i.e. relatively frequent maintenance operations), requires the removal of a large number of screws and the lifting up of a very heavy assembly consisting of the lid and of the optical unit (which, being partly made of steel, can weigh between 8 and 9 kg): this, moreover, exposing the sealed off base member to a risk of penetration of foreign matter (such as water, dust, stones, ...) which increases with the size of the uncovered surface, and which can affect tightness preservation during reassembling.

It has been proposed to make the optical unit removable independently of the lid, through an opening in the center of said lid, but its removal in this way is very difficult and requires the use of particularly adapted instruments as well as the creation of "holds" on the optical unit since, in its working position, said unit should be on the same upper level as the lid and therefore is not easy to grasp. Such "holds" form bumps on the surface of the runways, which bumps are damaging to the tyres of aircraft being wheeled over them.

OBJECT OF THE INVENTION

It is the object of the present invention to propose a light with removable optical unit in which the maintenance operations are made particularly easy, and which shows none of the aforesaid drawbacks.

To this effect, the invention proposes a light equipped with means for guiding the optical unit according to a vertical translation, and means for interlocking the optical unit and the light, arranged in such a way that the locking or unlocking control of said means causes the vertical translation motion upward or downward of the unit between a grasping position in which the unit projects sufficiently from the upper level of the lid to be grasped and removed, and its working position, and vice-versa.

Advantageously, the optical unit has an overall cylindrical shape and is received in an aperture also of overall cylindrical shape, the ratio of the depth to the diameter of which is at least ½ and preferably between 0.6 and 0.7. These proportions prevent any jammings.

But according to an original disposition, particularly efficient to prevent jammings, the optical unit is of overall cylindrical shape and is received in an aperture of overall cylindrical shape, the unit and the aperture having two different cylindrical sections, a base section and an edge section respectively, separated by an intermediate offset section, the diameters of the base sections being smaller than the diameters of the edge sections. This disposition permits a very efficient vertical guiding, without jamming.

It is possible, with such vertical guiding, to adopt a single and off-centered interlocking means (the off-centering being made necessary by the fact that the center of the unit is occupied by the lamp) without any fear of jammings. The preferred means is a nut bolt system.

Advantageously, the nut and bolt system is composed of a bolt, fast with the lid and cooperating with a single eccentric nut fast with the optical unit.

Said bolt may be removable. As to the nut, this is designed to be unlosable, by being confined in the optical unit, for example via a plate fixed to the optical unit.

Simple unscrewing of the one locking bolt thus causes the optical unit to rise sufficiently high to be removed manually without the need of any specialized tool.

BRIEF DESCRIPTION OF THE DRAWINGS

The invention will be more readily understood on reading the following description with reference to the accompanying drawings, in which:

FIG. 1 is a view of a vertical section I—I of a light according to the invention, FIG. 2 is a plan view of said light.

DESCRIPTION OF THE PREFERRED EMBODIMENT

Figure 3:
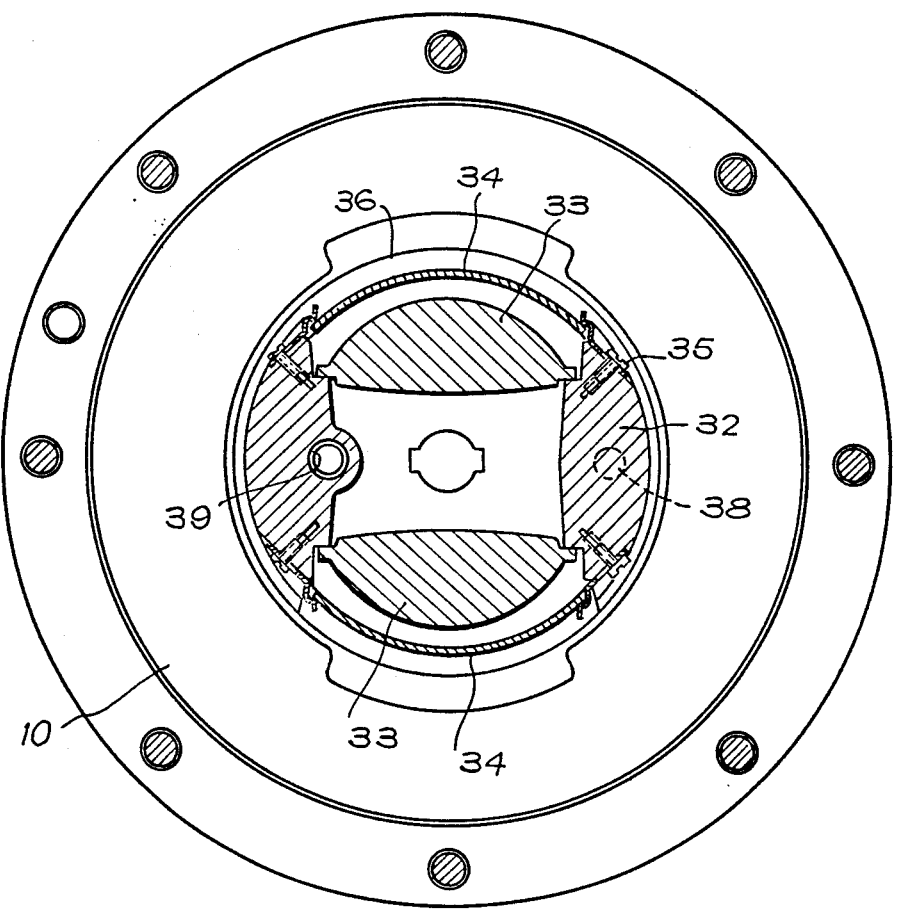
FIG. 3 is a view of a horizontal section III—III of the light of FIG. 1.

Referring now to the figures, the light comprises a seating 1 constituted of a base 2 and of a cylindrical wall 3 both of which are adapted to offer the necessary resistance and to house part of the light electrical components, such as the spring contacts 4 designed to receive and bear the contacts 5 of the electric lamp 6 fixed by removable means 8 on the optical unit. Said electrical components are powered via a lead 7 connected outside the light.

The lid 9 is formed of an upper plate 13 and of a lower plate 10 resting via a peripheral flange 11 and an annular rib 12 on a peripheral shoulder 14 and an annular rib 15 of the seating 1. A toric seal 16 is provided between the plate 13 and the inner volume of the seating 1.

Annular or partly annular prism elements 17 are provided between the lower 10 and the upper 13 plates of the lid 9, at the level of two opposite windows, with interposition of resilient insulating elements 18. Fastening means 19 are provided for peripherally interlocking the upper plate 13 and the lower plate 10.

Means 21 are provided for fastening the lid assembly 9 to the seating 1.

The upper plate 13 extends over a small height from the upper edge of the seating 1, to form a truncated ring of low gradient 20' leading to a horizontal rim 20.

Lid 9 provides in its center an opening of overall cylindrical shape which communicates at the bottom with the inner volume of the seating 1.

The opening of overall cylindrical shape is essentially composed of two cylindrical sections bored at different diameters: a base cylindrical section 22 and an edge cylindrical section 23, the diameter of which latter is slightly more than the diameter of the base section. Sections 22 and 23 are separated by an intermediate section 24 which is substantially wider than the base section 22.

Edge section 23 ends in an oblique shoulder 25 which widens the opening.

Base section 22 ends in an abutment shoulder 26 extending over substantially all the cylindrical periphery.

Figure 4:
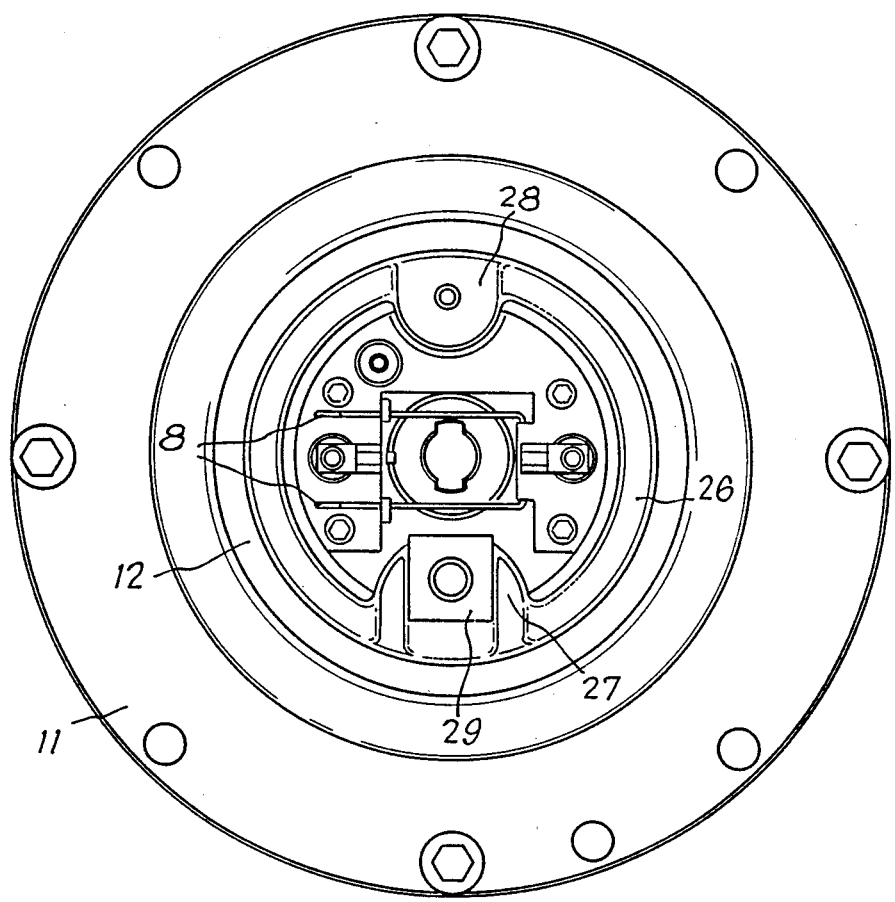
FIG. 4 is a bottom view of the plate and of the optical unit.

At a level below that of shoulder 26, there are two radial projections 27, 28 in facing relationship, extending inwardly from the rib 12 of the lower plate 10. Projection 27 has two branches (FIG. 4) between which a nut 29 can fit and be locked in position. Projection 28 has a vertical orifice receiving the tail of a smooth chamferred pin 30.

The optical unit 31 comprises a body of overall cylindrical shape 32 adapted to the central opening of the lid. The body 32 is hollow in order to contain the lamp 6 and is provided with two side windows on which are mounted the light concentration lenses 33 and the colored filters 34, which latter are cylindrically shaped and secured to the body 32 via removable fastening means 35.

Body 32 comprises a complete or substantially complete cylindrical base section 36 corresponding, with a very small play, to the bore of the base section 22, and a complete or substantially complete cylindrical edge section 37, corresponding, with a relatively small play, to the bore of the edge section 23. This last play is greater than the play of the base sections, because of the relative inaccuracy of position of the edge section 23 with respect to the base section 22 caused by the fastening of upper plate 13 (in which is formed the edge section 23) on the lower plate 10 (in which is formed the base section). Said sections 36,37 are separated by an intermediate section 50 of reduced diameter.

The bottom of body 32 is so shaped as to be able to bear against abutment shoulder 26, a slight bevel being formed on the edge of the base section 36.

In body 32, in quadrature with the optical devices, a thickening of the wall makes it possible to provide two radially opposite vertical holes 38,39.

Blind hole 38 issues on the bottom of the body and can receive, with play, the pin 30.

Through hole 39 is designed to be aligned with the nut 29 above which it issues into the bottom of the body. Hole 39 issues upwardly, forming a widening 40 designed to receive the head 41 of a bolt 42 of which the threading 43 cooperates with the tapping in nut 29.

A seal 44 and a washer 45 are placed under the bolt head 41 before this is translationally locked in position in its chamber 40 by way of a plate 46 in stainless steel (like the lid) fixed on the optical unit by means of four six-point socket screws 47, with interposition of a peripheral seal 48. Plate 46 comprises a hole 49 giving access to the six-point socket of the head 41 of bolt 42. Plate 46 is level with the rim 20.

For removing the optical unit 31, the device according to the invention works as follows.

Using a wrench, the bolt 42 is simply unscrewed, which, by reaction against the fixed nut 29, causes the rising of the optical unit assembly 31 according to a vertical direction which is preserved due to the cylindrical bores 22, 23. When the bolt 42 is out of the nut, the optical unit 31 protrudes sufficiently from the rim 20 of the lid to be grasped and brought out manually of the lid 9. Because of the diameter differences between the bores of the base and edge sections, the optical unit 31 passes through the edge section 23 without any problems.

The operations are reversed for re-inserting the optical unit 31. With the pin 30, the optical unit 31 is positioned neatly in such a way that bolt 42 finds the nut 29 immediately. For reasons already mentioned above, the optical unit 31 passes through edge section 23 smoothly; and when the bevel of the base section 36 of the optical unit 31 reaches the base section 22 of the lid, the unit can glide through without any fear of jamming, despite the very small play, due to the parallelism imposed by the presence of the two bores, and preventing the optical unit from tilting with respect to the axis of the bores of a sharper gradient than that causing the jamming phenomena.

It is worth observing that the electrical contacts of the lamp 6 are automatically disconnectable when the optical unit comes apart from the lid 9.

It is also worth noting that the optical unit transfers perfectly the loads that it receives to the shoulder 26 which, via the rib 12, transmits them to the seating 1.

One advantage of the described embodiment resides in the low amount of bumps created on the surface of the play. The holes of screws 47 are very small and there is only one orifice 49. This therefore reduces the damaging nature of runway lights for the tires of aircraft.

What is claimed is:

1. Flush-type runway light for airport runways, of the type comprising an embedded seating, a lid fixed on the seating, and an optical unit removable through an opening in the center of the lid, and housed, while in working position, so as to be on the same upper level as the lid, said optical unit comprising a cylindrical body and an electric lamp, and wherein means are provided in said light for guiding the optical unit in vertical translation, as well as means for interlocking the optical unit and the lid arranged in such a way that the locking or unlocking control of said means causes selected vertical translational motion of said unit including a grasping position in which the unit protrudes sufficiently from the upper level of the lid to be grasped and removed from its working position.

2. Light as claimed in claim 1, wherein the optical unit is of overall cylindrical shape and is received in an opening of overall cylindrical shape of which the depth to diameter ratio is at least $\frac{1}{2}$.

3. Light as claimed in claim 1, wherein the interlocking means are nut and bolt means.

4. Light as claimed in claim 3, wherein said nut bolt means comprise a nut fast with the lid and cooperating with an off-centered bolt fast with the optical unit.

5. Light as claimed in claim 4, wherein the nut is removable.

6. A flush-type light for airport runways comprising an embedded seating member, a lid assembly removably affixed to said seating member, said lid assembly including a top and a central opening, an optical unit comprising a cylindrical body having a shape corresponding to said opening, interlocking means, an electric lamp and a top, said optical unit being removably secured within said central opening of said lid assembly, a passageway extending longitudinally through said optical unit, a threaded nut affixed within said lid assembly beneath said passageway, a bolt extending through said passageway for threaded reception in said nut, and means restraining said bolt against longitudinal movement relative to said optical unit, whereupon with said bolt in tightened down position in said nut the top of said optical unit is flush with the top of said lid assembly and with said bolt loosened from said nut said optical unit is raised from said lid assembly to a grasping position.

7. A flush-type light for airport runways as claimed in claim 6, wherein said opening in said lid assembly is a generally cylindrical opening defined by a base cylindrical section and an edge cylindrical section separated by an intermediate section, said optical unit including a cylindrical base section for reception in said base cylindrical section of said lid assembly and a cylindrical edge section for reception in said edge cylindrical section of said lid assembly.

8. Flush-type runway light for airport runways, of the type comprising an embedded seating, a lid fixed on the seating, and an optical unit removable through an opening in the center of the lid, and housed, while in working position, so as to be on the same upper level as the lid, wherein means are provided in said light for guiding the optical unit in vertical translation, as well as means for interlocking the optical unit and the lid arranged in such a way that the locking or unlocking control of said means causes selected vertical translational motion of said unit including a grasping position in which the unit protrudes sufficiently from the upper level of the lid to be grasped and removed from its working position, wherein the optical unit is of overall cylindrical shape and is received in an opening of overall cylindrical shape of which the depth to diameter ratio is at least ½, said unit and opening comprising two separate cylindrical sections, respectively a base section and an edge section, separated by an offset intermediate section, the diameter of the intermediate section of said opening being greater than the diameter of the base and edge sections of said opening and the diameter of the intermediate section of said unit being smaller than the diameter of the base and edge sections of said unit and the diameters of the base sections being smaller than the diameters of the respective edge sections.

9. Flush-type runway light for airport runways, of the type comprising an embedded seating, a lid fixed on the seating, and an optical unit removable through an opening in the center of the lid, and housed, while in working position, so as to be on the same upper level as the lid, wherein means are provided in said light for guiding the optical unit in vertical translation, as well as means for interlocking the optical unit and the lid arranged in such a way that the locking or unlocking control of said means causes selected vertical translational motion of said unit including a grasping position in which the unit protrudes sufficiently from the upper level of the lid to be grasped and removed from its working position, wherein the interlocking means are nut and bolt means, said nut and bolt means comprising a nut fast with the lid and cooperating with an off-centered bolt fast with the optical unit, the bolt being confined in the optical unit by a plate fixed to said unit.

* * * * *